US006471341B1

(12) United States Patent
Yoshimura et al.

(10) Patent No.: US 6,471,341 B1
(45) Date of Patent: *Oct. 29, 2002

(54) INK JET HEAD ALLOWING HIGHLY DENSE ARRANGEMENT OF NOZZLES

(75) Inventors: Hisashi Yoshimura, Nara; Kohji Tsurui, Sakurai; Kazuya Koyama, Ikoma, all of (JP)

(73) Assignee: Sharp Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/620,316

(22) Filed: Mar. 22, 1996

(30) Foreign Application Priority Data

Mar. 23, 1995 (JP) ............................................ 7-063944

(51) Int. Cl.[7] ................................................ G01D 15/18

(52) U.S. Cl. ............................. 347/70; 347/68; 347/71

(58) Field of Search .............................. 347/68, 70, 71

(56) References Cited

U.S. PATENT DOCUMENTS 4,199,769 A 4/1980 Fischbeck .................... 341/48
4,455,560 A * 6/1984 Louzil .......................... 347/71
4,520,374 A * 5/1985 Koto ........................... 347/71
4,550,325 A * 10/1985 Viola .......................... 347/68
5,359,350 A * 10/1994 Nakano et al. ............... 347/68
5,360,943 A * 11/1994 Mori et al. ............... 174/84 R
5,575,577 A * 11/1996 Kawakami et al. ...... 400/705.1
5,660,486 A * 8/1997 Okuda et al. .......... 400/120.07

OTHER PUBLICATIONS

Patent Abstracts of Japan, vol. 18, No. 065, Feb. 3, 1994.
Patent Abstracts of Japan, vol. 17, No. 201, Apr. 20, 1993.
Patent Abstracts of Japan, vol. 16, No. 471, Sep. 30, 1992.
Patent Abstracts of Japan, vol. 18, No. 115, Feb. 24, 1994.
Patent Abstracts of Japan, vol. 17, No. 679, Dec. 14, 1993.
Patent Abstracts of Japan, vol. 18, No. 304, Jun. 10, 1994.
Patent Abstracts of Japan, vol. 17, No. 576, Oct. 20, 1993.
Patent Abstracts of Japan, vol. 17, No. 595, Oct. 29, 1993.
Patent Abstracts of Japan, vol. 18, No. 398, Jul. 26, 1994.
Patent Abstracts of Japan, vol. 94, No. 011.
Patent Abstracts of Japan, vol. 16, No. 195, May 12, 1992.
Patent Abstracts of Japan, vol. 18, No. 025, Jan. 14, 1994.

* cited by examiner

*Primary Examiner*—Bao Q. Vu

(57) ABSTRACT

An ink jet head includes an ink supply path, a pressure chamber, an orifice and an oscillator. By bending a portion of the wall surface of the pressure chamber by oscillation of oscillator, ink is emitted. A portion of the wall surface of pressure chamber is formed by an oscillating plate of resin, and a unimorph including an elastic plate and oscillator provided on oscillating plate. Sidewalls separating the inside of pressure chamber are provided, and the dimension between the sidewalls is made shorter than the dimension of the unimorph.

14 Claims, 11 Drawing Sheets

Fig.8b
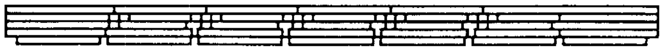
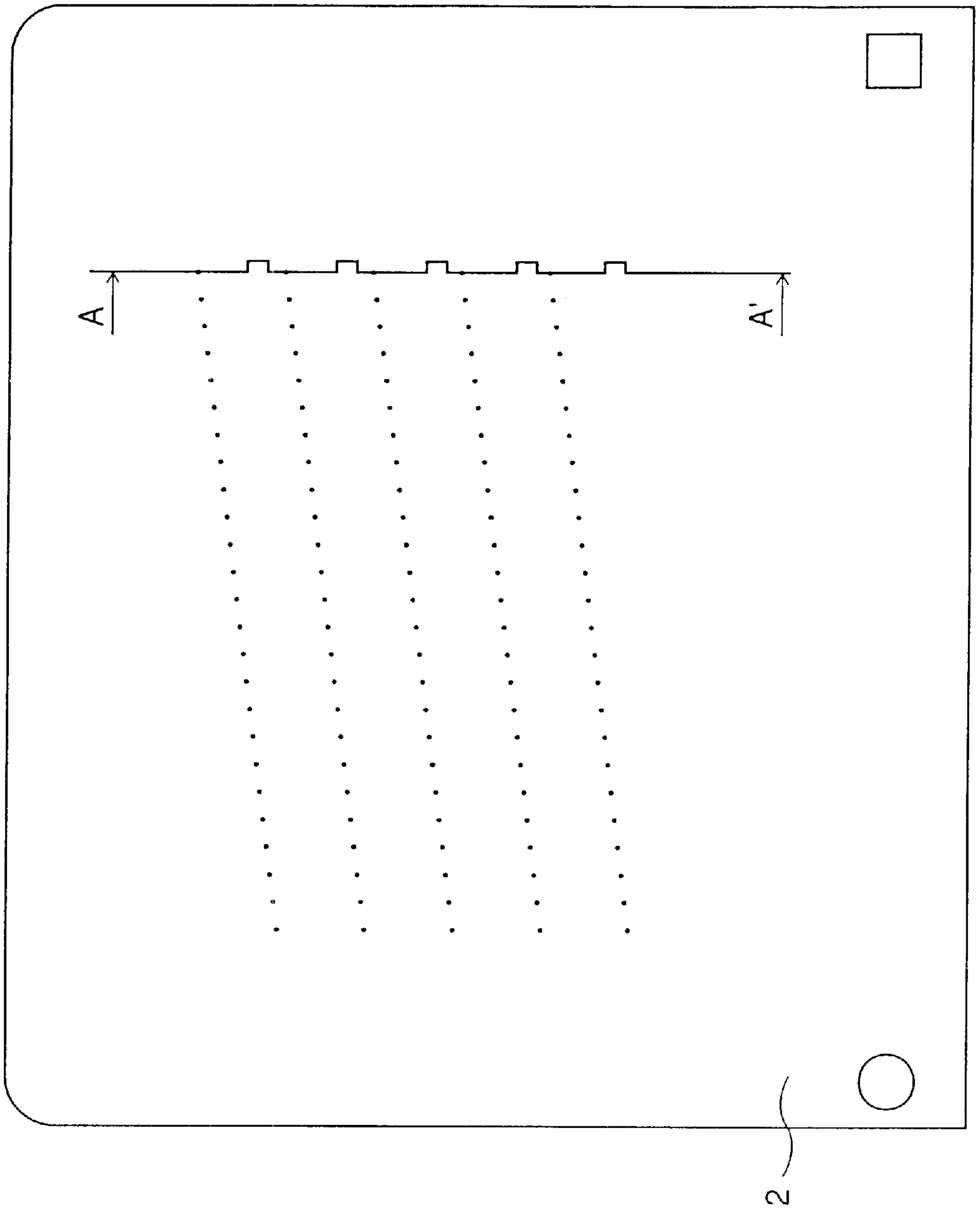
Fig.8a

JIG AND OSCILLATOR PLATE ARE ADHERED BY HEAT-SEPARATING TYPE TAPE

PLATE IS CUT TO PRESCRIBED SIZE BY DICING SAW

LOW ELASTICITY SHEET WITH PATTERN OF BODIES HAVING HIGE MODULUS OF ELASTICITY (SUCHAS FPC) IS ADHERED BY ADHESIVE

ADHERED ON NOZZLE BODY BY ADHESIVE

HEAT & SEPARATE TAPE

FPC WITH REAR ELECTRODES IS ADHERED WITH ANISOTROPIC CONDUCTIVE FILM

INK JET HEAD ALLOWING HIGHLY DENSE ARRANGEMENT OF NOZZLES

BACKGROUND OF THE INVENTION

1. Field of the Invention

The present invention relates to an ink jet head used for an ink jet printer or the like, and more specifically, it relates to an ink jet head allowing highly dense arrangement of nozzles.

2. Description of the Related Art

An ink jet head of interest to the present invention is disclosed, for example, in Japanese Patent Laying-Open No. 6-64163. FIG. 10 is a perspective view of the ink jet head disclosed in this laid-open patent application. Referring to FIG. 10, there are a plurality of nozzle openings 101*a*, 101*b*, . . . formed in a nozzle forming member 102. A pressure chamber forming member 103 is provided adjacent to nozzle forming member 102. An oscillating plate 104 is adhered to pressure chamber forming member 103. Electrodes are formed on both sides of oscillator 107. One electrode is connected to oscillating plate 104 and the other electrode is connected to a driving circuit by means of an anisotropic conductive film 108 or the like. Oscillating plate 104 also serves as a GND electrode. At a portion surrounded by nozzle forming member 102, pressure chamber forming member 103 and oscillating plate 104, there are formed a pressure chamber 110 and an ink outlet 111, filled with ink. When a voltage is applied between electrodes, a unimorph constituted by oscillating plate 104 and oscillator 107 is bent, pressing pressure chamber 110, so that ink drops are emitted from nozzle openings 101*a*, 101*b*, . . . In the figure, the reference character 112 represent a common ink pool, and 117 represents a flexible print circuit (FPC).

The conventional ink jet head was structured as described above. However, as the oscillating plate is formed of a metal, it has a problem that reactive force is considerably large. A piezoelectric element is used for the oscillator. When a voltage is applied to the piezoelectric element by a signal from the driving circuit, the oscillating plate is displaced because of unimorph effect with the oscillating plate. That the oscillating plate has high rigidity means there is large reactive force preventing displacement of the oscillating plate. Therefore, displacement of the oscillating plate is suppressed, change in volume of the pressure chamber becomes smaller and the efficiency in emitting ink is degraded. Accordingly, it is necessary to enlarge the area of the oscillator or to apply a high voltage to the oscillator to obtain energy necessary for the emission. However, if the area of the oscillator is enlarged, degree of integration of nozzles becomes lower, the head becomes larger and hence the apparatus as a whole cannot be made compact. Further, if a high voltage is applied to the oscillator to ensure an amount of deformation of the oscillator, power consumed by the head is undesirably increased.

FIG. 11*a* is a cross sectional view taken along the XI direction of the ink jet head shown in FIG. 10, and FIG. 11*b* is a side view of FIG. 11*a*. Referring to FIGS. 11*a* and 11*b*, in the conventional head, the dimensions of an elastic plate 105 and oscillator 107 oscillating the sidewall of the pressure chamber are smaller than the dimension of the corresponding wall surface of the pressure chamber.

SUMMARY OF THE INVENTION

Therefore, an object of the present invention is to provide an ink jet head which allows higher degree of integration of nozzles.

Another object of the present invention is to provide an ink jet head which can be made compact.

A still another object of the present invention is to provide an ink jet head allowing reduced power consumption.

The above described objects of the present invention can be attained by the ink jet head in accordance with the present invention in which oscillation is caused in a pressure chamber communicated with nozzles so as to partially bent a wall surface of the pressure chamber and to emit ink thereby, including an oscillating plate formed of resin provided at least on a part of the wall surface of the pressure chamber, and a unimorph including an elastic plate and an oscillator provided on the oscillating plate. The dimension of the bending portion provided by the unimorph is larger than the dimension of the wall surface of the pressure chamber corresponding to the unimorph.

The dimension of the bending portion provided by the unimorph is made larger than the dimension of the wall surface of the pressure chamber corresponding to the unimorph, whereby the dimension of the oscillator constituting the unimorph is made close to the channel pitch corresponding to the dimension between wall surfaces of the pressure chamber. Accordingly, highly dense arrangement of nozzles becomes possible.

More preferably, the ink jet head further includes a conductive film provided on the oscillator. The oscillator is adhered to the elastic plate by means of a first adhesive layer, and adhered to the conductive film by means of a second adhesive layer. The first adhesive layer is thicker than the second adhesive layer.

The thickness of the adhesive layer in contact with the oscillator is made thinner than on the side opposite to the oscillating plate, that is, on the side of the conductive film. Therefore, the problem that the adhesive layer on the side opposite to the oscillating plate binds the oscillator and prevents deformation of the oscillating plate, can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8*a* shows nozzles of the ink jet head in accordance with the present invention, and FIG. 8*b* is a cross section taken along the line 1—1' of FIG. 8*a*.

DESCRIPTION OF THE PREFERRED EMBODIMENTS

First Embodiment

Figure 1A:
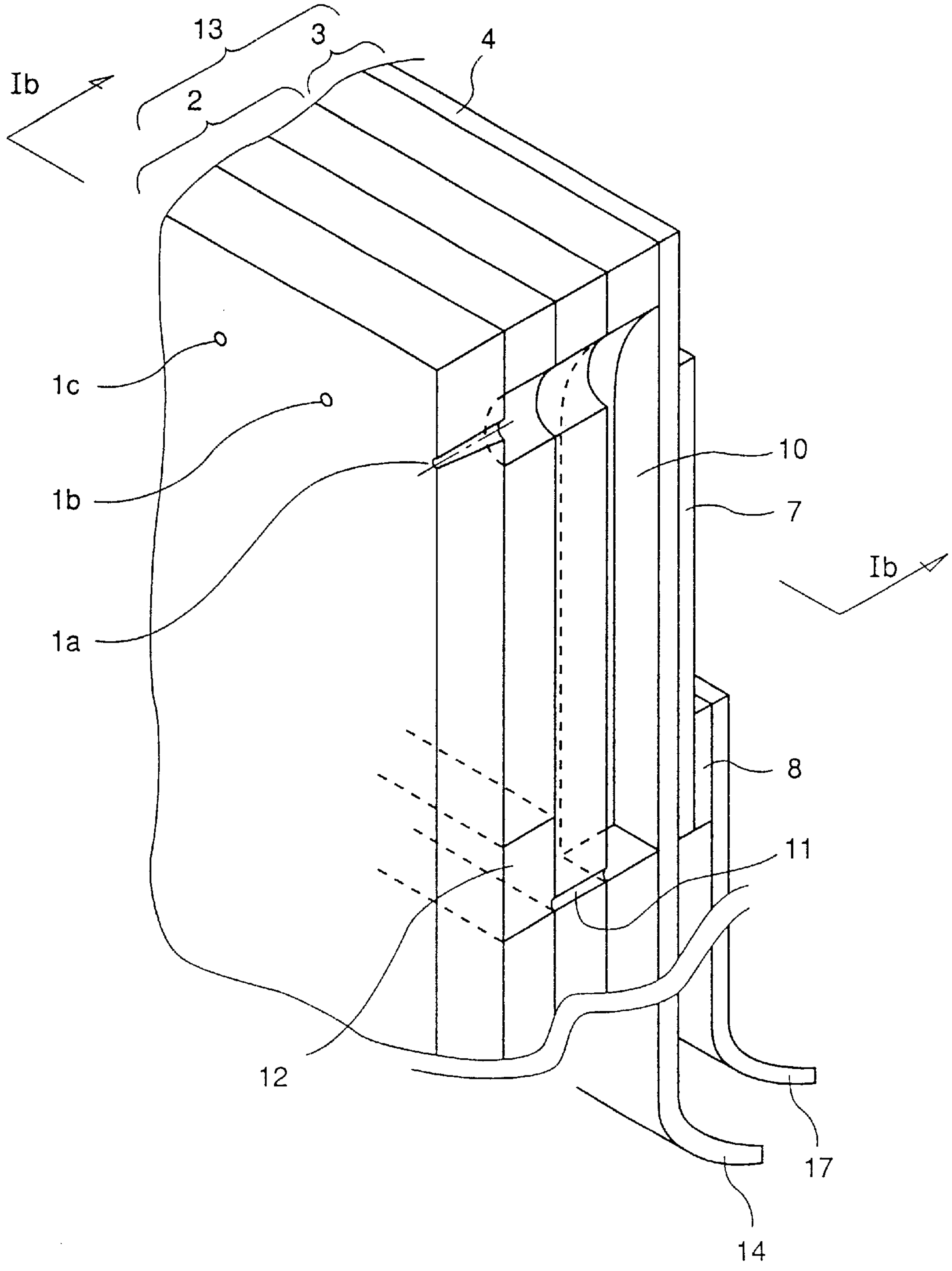
FIGS. 1*a* to 1*c* are perspective view and cross sections, respectively, of an ink jet head in accordance with the present invention.
Figure 1B:
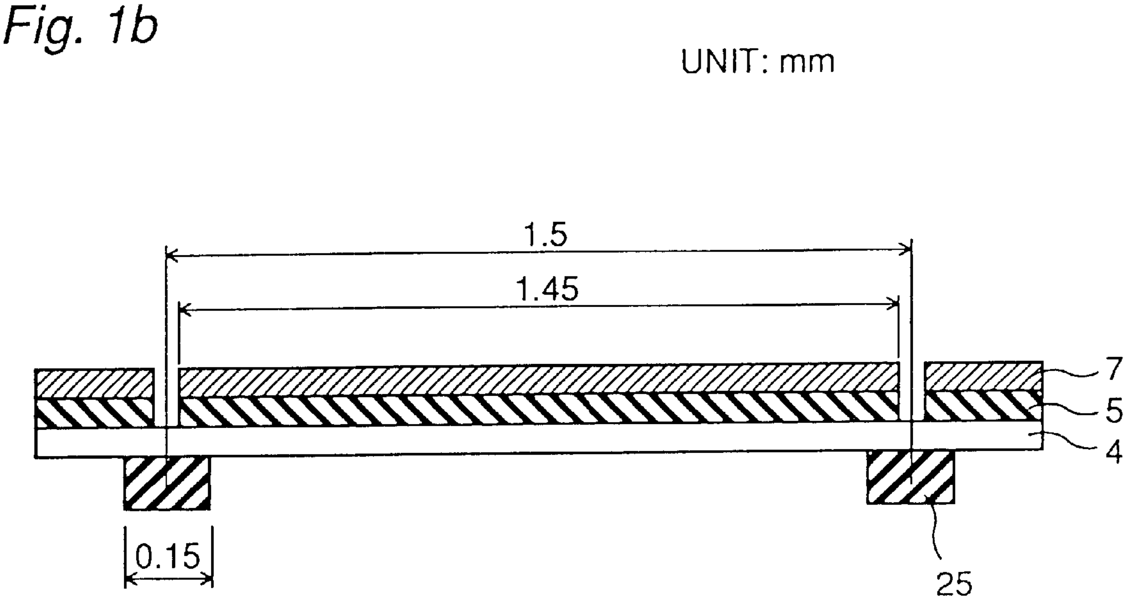
Figure 1C:
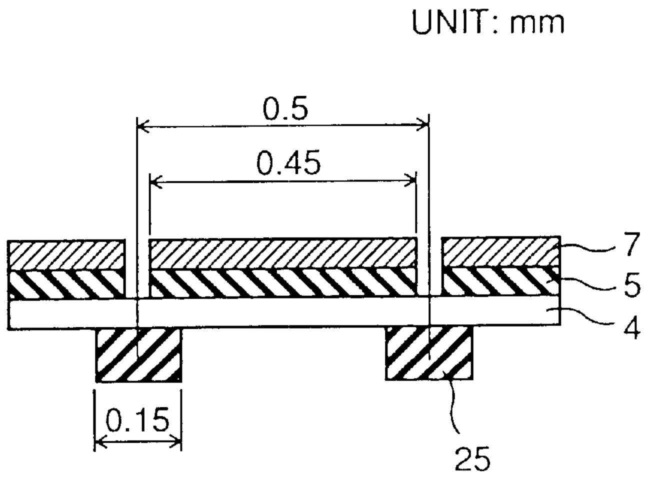

Referring to FIGS. 1*a* to 1*c*, a plurality of nozzle openings 1*a*, 1*b*, . . . are formed in nozzle forming member 2. Pressure chamber forming member 3 is provided adjacent to nozzle forming member 2. An oscillating plate 4 formed of resin is provided adjacent to pressure chamber forming member.

Figure 2A:
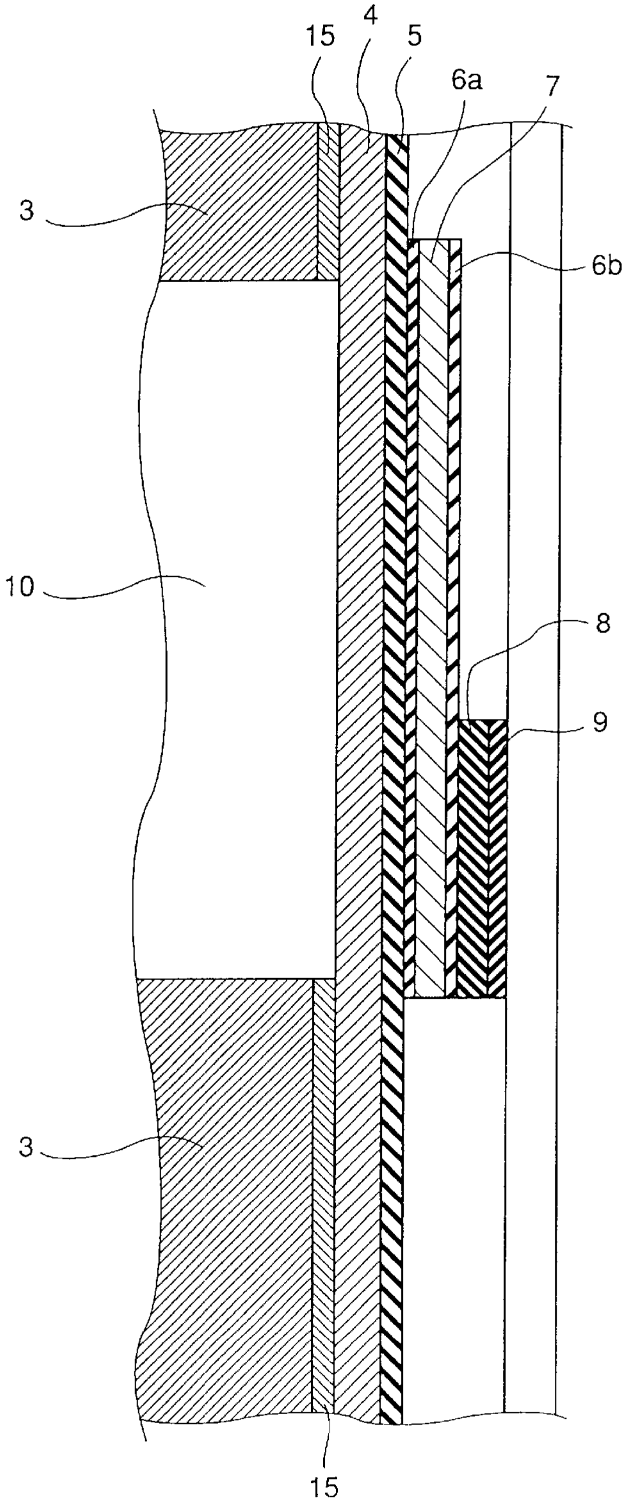
FIG. 2*a* is a side view of the ink jet head in accordance with the present invention.

Referring to FIG. 2*a*, an elastic plate 5 which also serves as an electrode, is provided adjacent to oscillating plate 4. An oscillator 7 formed of a piezoelectric element is provided adjacent to oscillating plate 4. Electrodes 6*a*, 6*b* are arranged on both surfaces of oscillator 7. One electrode 6*a* conducts electricity by contacting with the elastic plate 5 which also serves as an electrode, and the other electrode 6*b* conducts electricity by contacting with a connecting terminal 9 with an anisotropic conductive film 8 or the like interposed.

In a portion surrounded by nozzle forming member 2, pressure chamber forming member 3 and oscillating plate 4, pressure chamber 10 and ink outlet 11 are formed, filled with ink. Ink outlet 11 is further communicated with common ink pool 12. Head substrate 13 is constituted by nozzle forming member 2 and pressure chamber forming member 3.

When a voltage is applied between electrodes 6*a* and 6*b*, a contracting force in the planar direction acts on oscillator 7, a unimorph constituted by oscillator 7 and elastic plate 5 is bent, pressing oscillating plate 4, so that volume of pressure chamber 10 is changed and ink drops are emitted from nozzle openings 1.

Nozzle forming member 2 and pressure chamber forming member 3 are formed, for example, of stainless parts, bonded by diffusion bonding, for example, and assembled as head substrate 13.

In the present embodiment, elastic plate 5 electrically in contact with oscillator 7 and oscillating plate 4, and a signal line connected thereto are formed integrally on an FPC (Flexible Print Circuit) 14, so as to facilitate assembly. However, it is also possible to fabricate these separately and then assemble the separately provided parts. Referring to FIG. 2(*a*), oscillating plate 4 is fixed on head substrate 13 by means of an epoxy resin adhesive 15, for example.

Oscillator 7 is formed of a sheet of a piezoelectric element, on both surfaces of which metal films 6*a* and 6*b* as electrodes are formed. The thinner the sheet, the larger strain can be obtained with lower voltage, and hence the smaller becomes the power consumption.

Oscillator 7 is in contact with elastic plate 5 on one surface, and in contact with connecting terminal 9 on the other surface. Connecting terminal 9 is integral with FPC, and it is connected to the driving circuit.

Figure 2B:
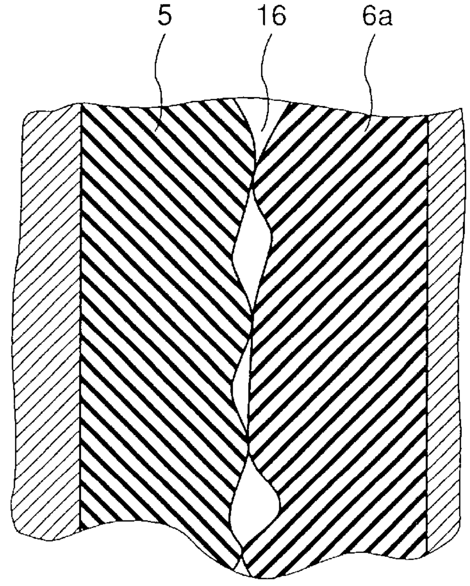
FIG. 2*b* is a partial enlargement of FIG. 2*a*.

FIG. 2*b* is an enlarged view of connecting portion between elastic plate 5 and oscillator 7. Referring to FIG. 2*b*, a conductive adhesive or an epoxy resin 16, for example, Amicon A-316 manufactured by Grace Company, is used for the bonding between oscillator 7 and elastic plate 5. Though not conductive, epoxy resin layer is sufficiently thin, and therefore it is electrically connected to the electrode (elastic plate 5) of FPC 14, as well as to oscillator 7 at ups and downs of electrode 6*a*.

Another electrode 6*b* of the PZT is in contact with electrode 9 of FPC 17 by means of anisotropic conductive film 8, such as 3370C manufactured by Three Bond Company. Anisotropic conductive film 8 is thicker as an adhesive layer as compared with epoxy resin (epoxy resin layer is at most 5 $\mu$m, while anisotropic conductive film is about 35 $\mu$m in thickness), and therefore it does not strongly bind movement of PZT 7. Therefore, it does not suppress deformation when PZT 7 and oscillating plate 4 deform toward the pressure chamber. In this case, by fixing only the periphery of electrode 9 by anisotropic conductive film 8, deformation is less suppressed.

FIG. 1*b* is a cross sectional view taken along the direction 1*b* of the ink jet head shown in FIG. 1*a*, and FIG. 1*c* is a side view of FIG. 1*b*. Referring to FIGS. 1*b* and 1*c*, one wall surface of the pressure chamber includes an oscillating plate 4, an elastic plate 5 formed on oscillating plate 4, and an oscillator 7 formed on elastic plate 5, of which dimensions are larger than the dimension of the corresponding wall surface of the pressure chamber. As a result, the size of the oscillator can be selected close to the channel pitch. As a result, highly dense arrangement of nozzles becomes possible.

Normal oscillation of the oscillator is ensured even if the channel pitch is made smaller, since oscillation at the sidewall portion of the channel is facilitated by employing a less elastic member as the oscillating plate.

In the head as a whole, nozzles are arranged lengthwise and widthwise as shown in FIGS. 8*a* and 8*b*.

Figure 6:
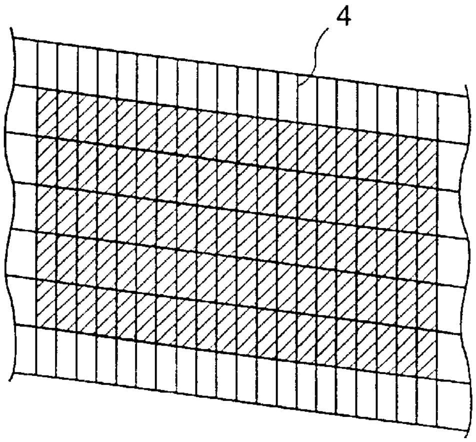
FIG. 6 shows an oscillator (PZT) plate in cut state.

FIG. 6 shows oscillators in the whole head in accordance with the embodiment shown in FIG. 1. Oscillators corresponding to respective nozzles are arranged like a lattice. The oscillators are cut out by using a dicing saw or the like, from a PZT of a slightly larger size. The method of assembly will be described with reference to FIGS. 9*a*, 9*b*, 9*c*, 9*d* and 9*e*. These oscillators are cut out from a large PZT plate 18 and bonded directly.

This method of assembly is employed from the following reasons. Namely, rather than adhering a PZT one by one on each corresponding channel, it is preferable that oscillator plate cut out and kept in the cut out state should be adhered as it is are to reduce the number of manufacturing steps and to reduce manufacturing cost. Further, since the size of the oscillator plate is made larger than necessary, the oscillator can be conveniently processed on a jig even when the size and position of the oscillator plate mounted on the jig is unsatisfactory.

Figure 9A:
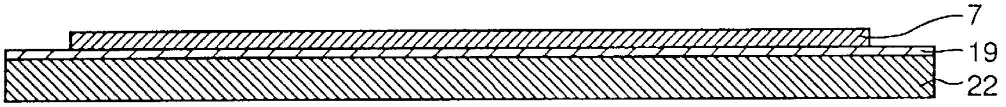
FIGS. 9*a* to 9*f* are cross sections showing the steps of assembling the ink jet head in accordance with the present invention.
Figure 9B:
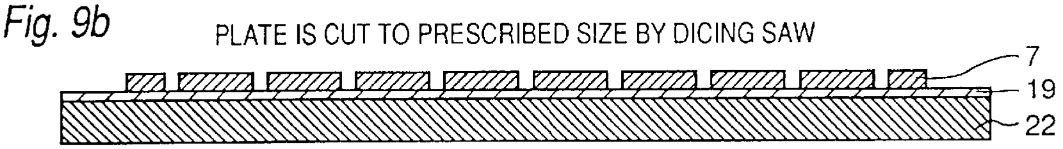
Figure 9C:
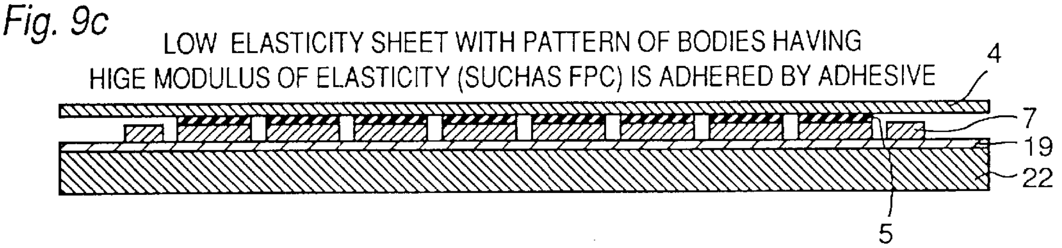
Figure 9D:
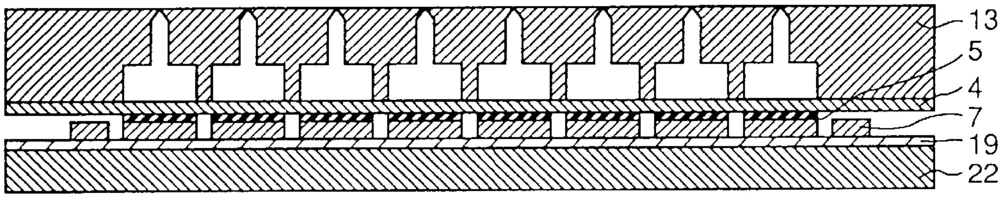
Figure 9E:
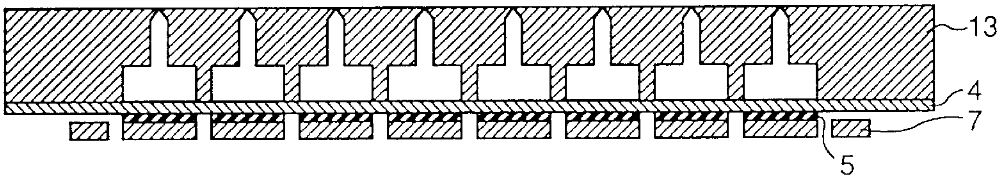
Figure 9F:
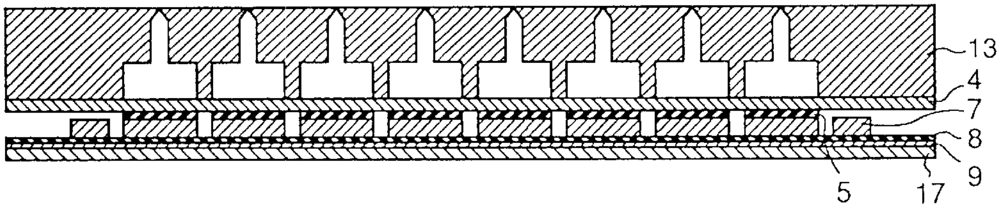
Figure 10:
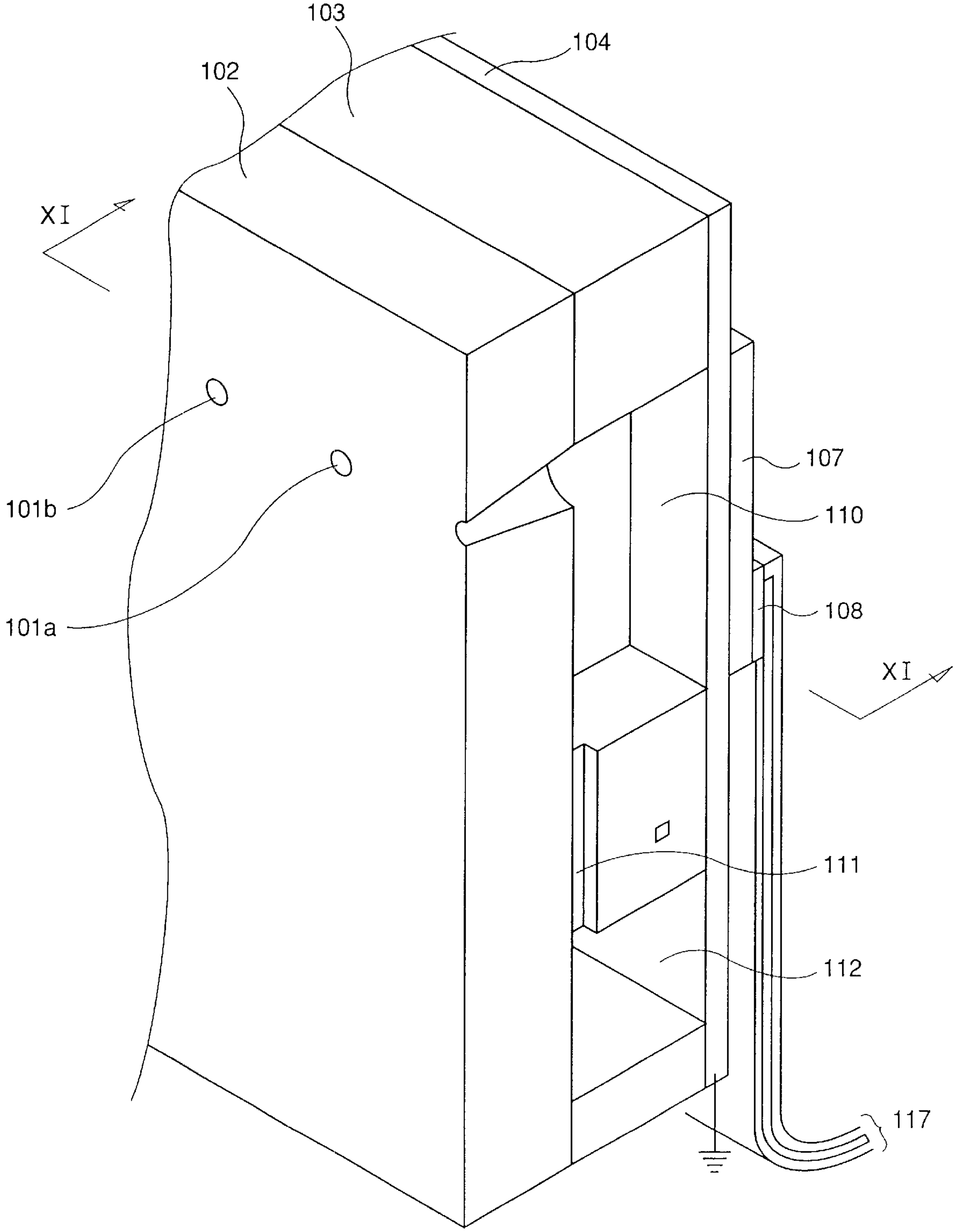
Fig.10 PRIOR ART
FIG. 10 is a perspective view of a conventional ink jet head.
Figure 11A:
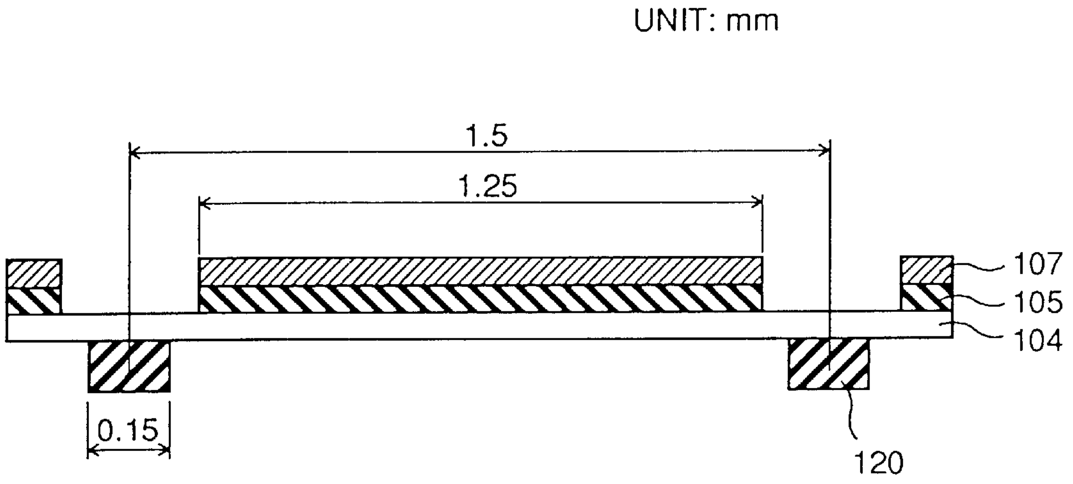
Fig. 11a PRIOR ART
FIGS. 11*a* and 11*b* are cross sections of a conventional ink jet head.
Figure 11B:
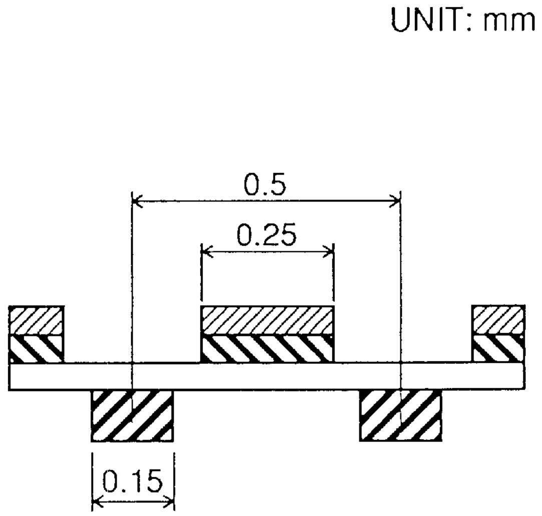
Fig. 11b PRIOR ART
Figure 1B:
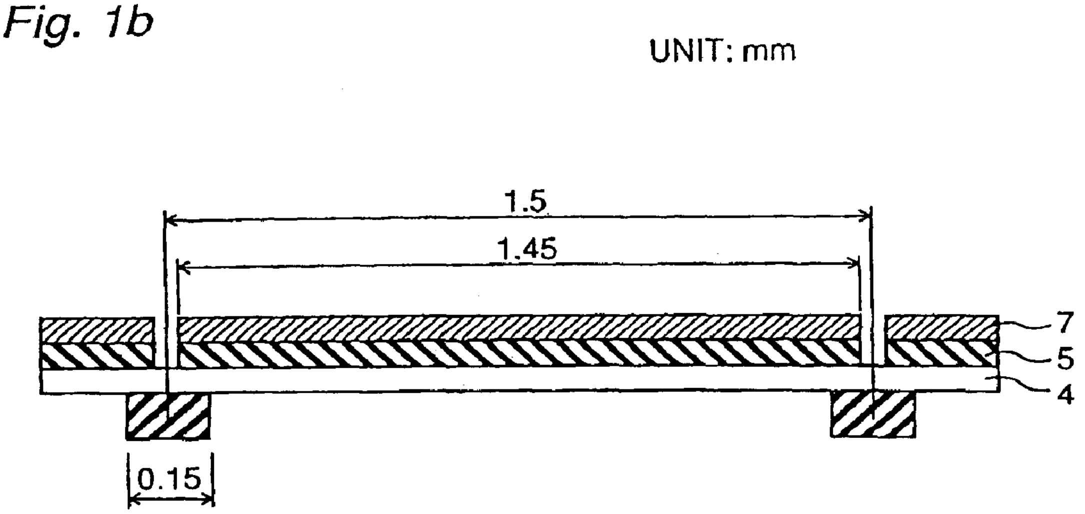
Figure 1C:
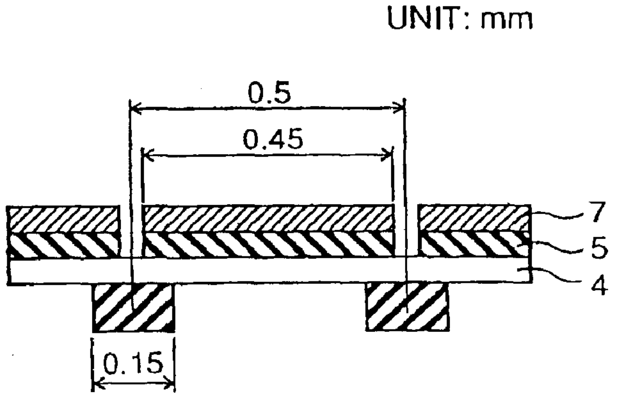
Figure 2A:
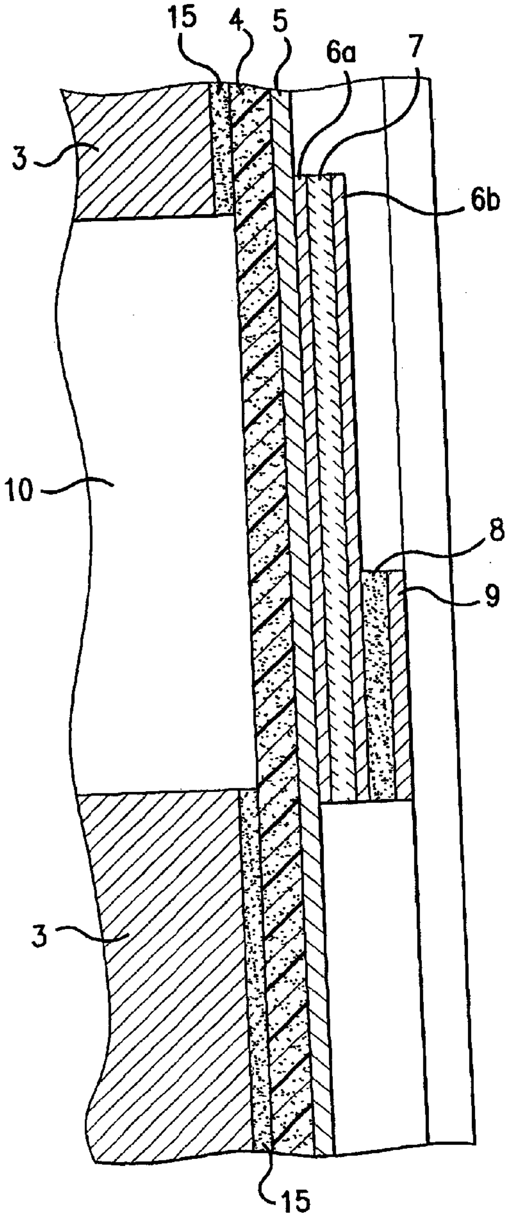
Figure 2B:
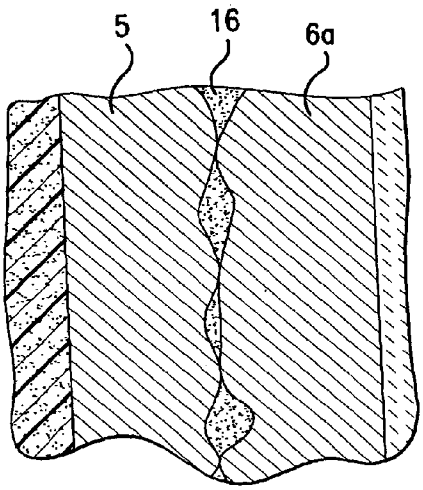
Figure 4A:
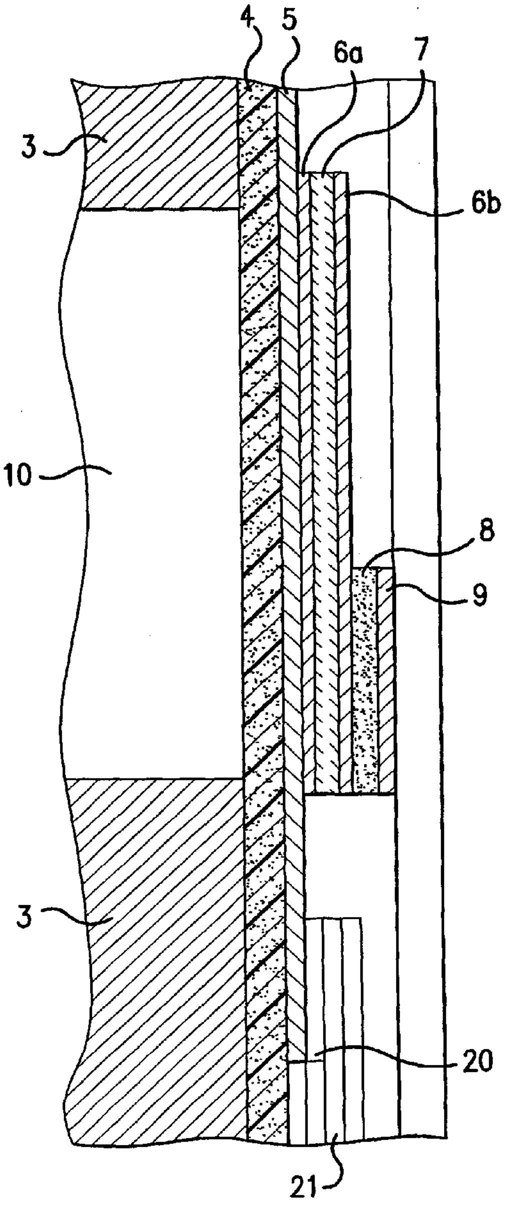
Figure 4B:
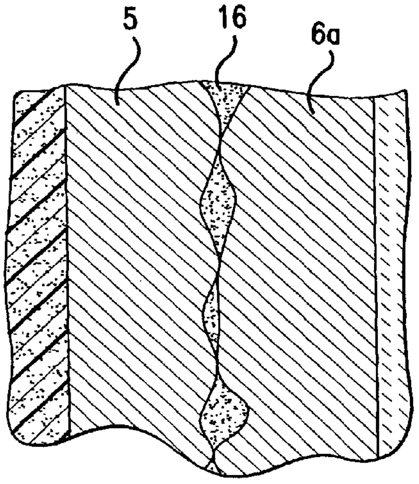
Figure 9A:
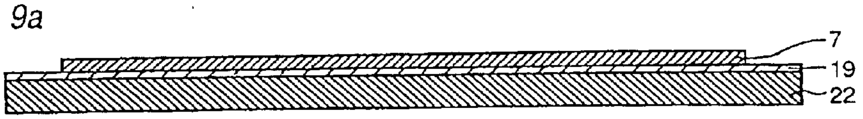
Figure 9B:
Figure 9C:
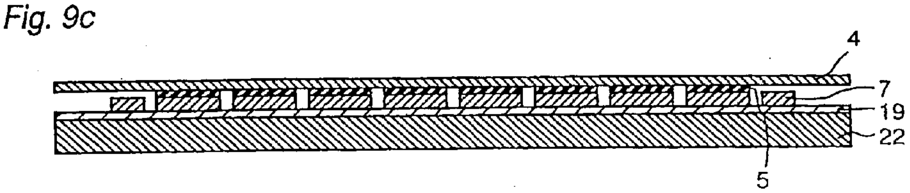
Figure 9D:
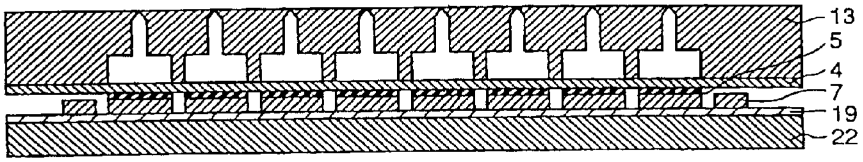
Figure 9E:
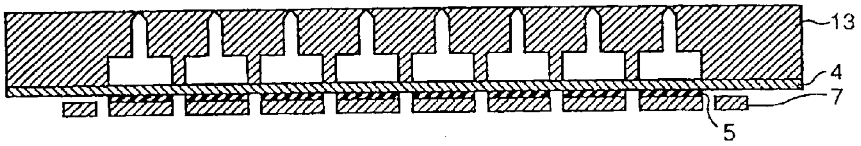
Figure 9F:
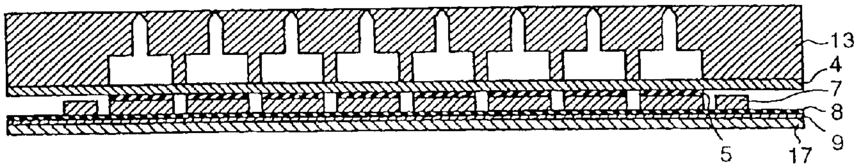
Figure 10:
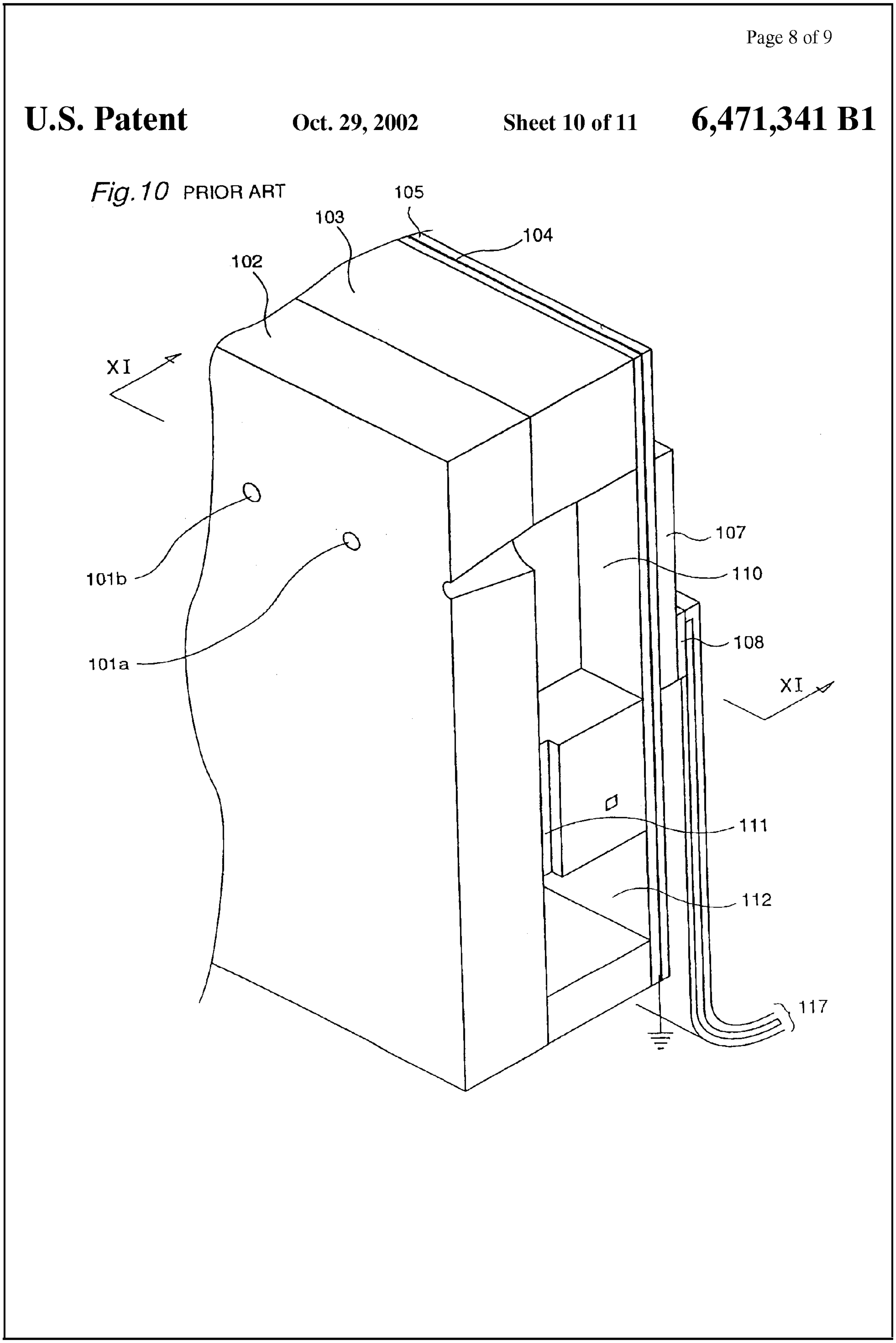
Fig. 10 PRIOR ART
Figure 11A:
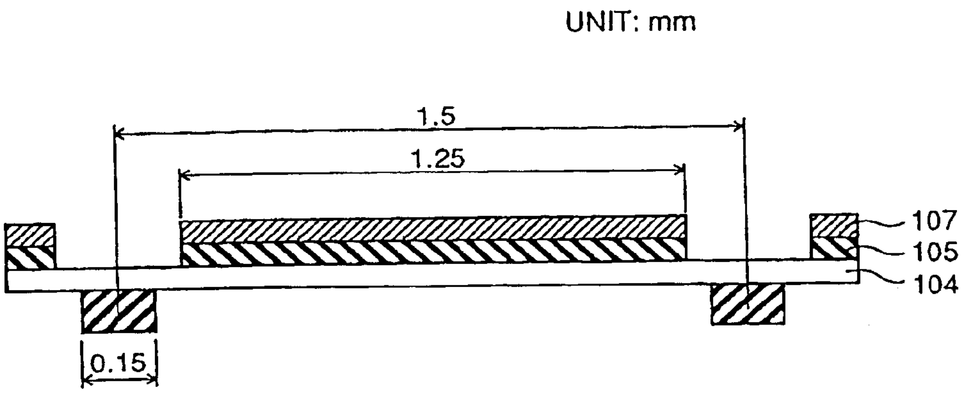
Fig. 11a PRIOR ART
Figure 11B:
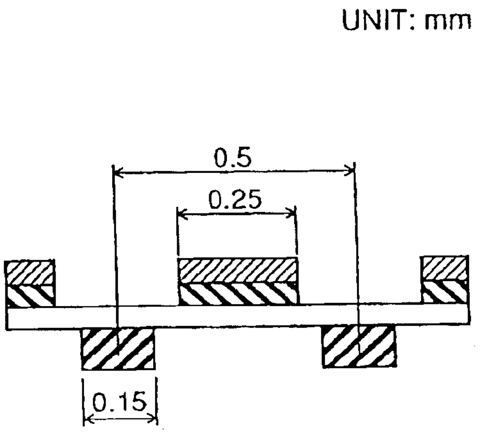
Fig. 11b PRIOR ART

The oscillator plate is fixed on a jig 22 by means of a double sided adhesive tape 19 which can be separated when heated (FIG. 9*a*), and the oscillator plates are cut to a prescribed size by a dicing saw in accordance with a reference of the jig (FIG. 9*b*). At this time, respective oscillator plates cut out from PZT plate 18 are already located at positions corresponding to the electrode on the side of the oscillating plate. On a sheet having low elasticity, the oscillator plate such as an FPC having a pattern of bodies having high modulus of elasticity is adhered (FIG. 9*c*), and a nozzle body is further adhered (FIG. 9*d*). Here such adhesion is controlled in accordance with reference holes, based on the reference holes of jig 22. Thus the steps of assembly can be simplified and adhesion with high precision becomes possible. Thereafter, the tape 19 is heated and separated (FIG. 9*e*). Thus oscillating plate 18 can be adhered on electrode 15 of oscillating plate all at once. Thereafter, FPC 17 having rear electrode is mounted with anisotropic conductive film 8 interposed (FIG. 9*f*).

Figure 5:
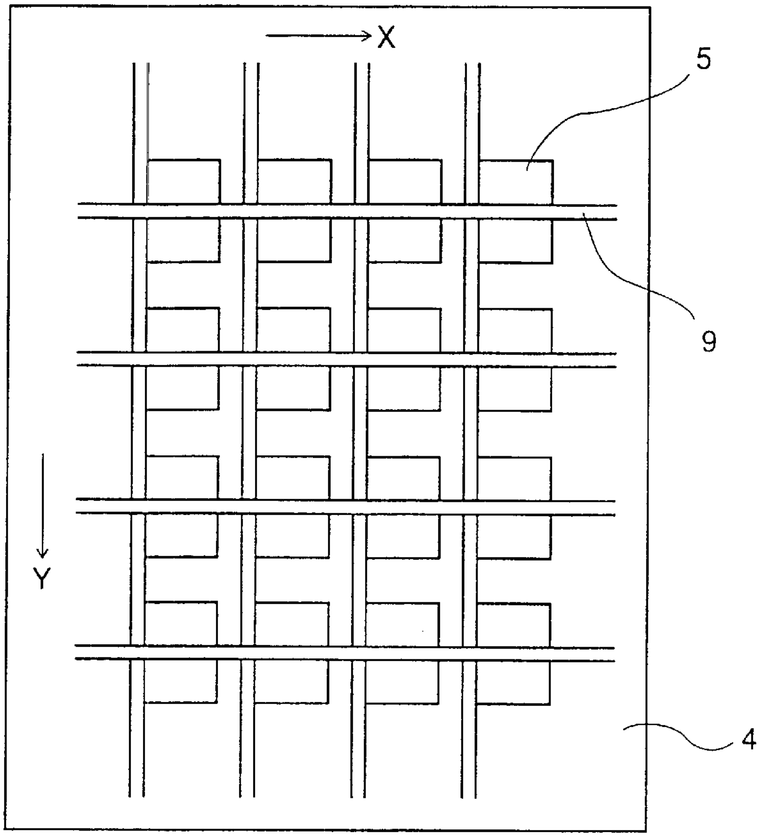
FIG. 5 shows an oscillating plate and a pattern of electrodes formed on the oscillating plate.
Figure 7:
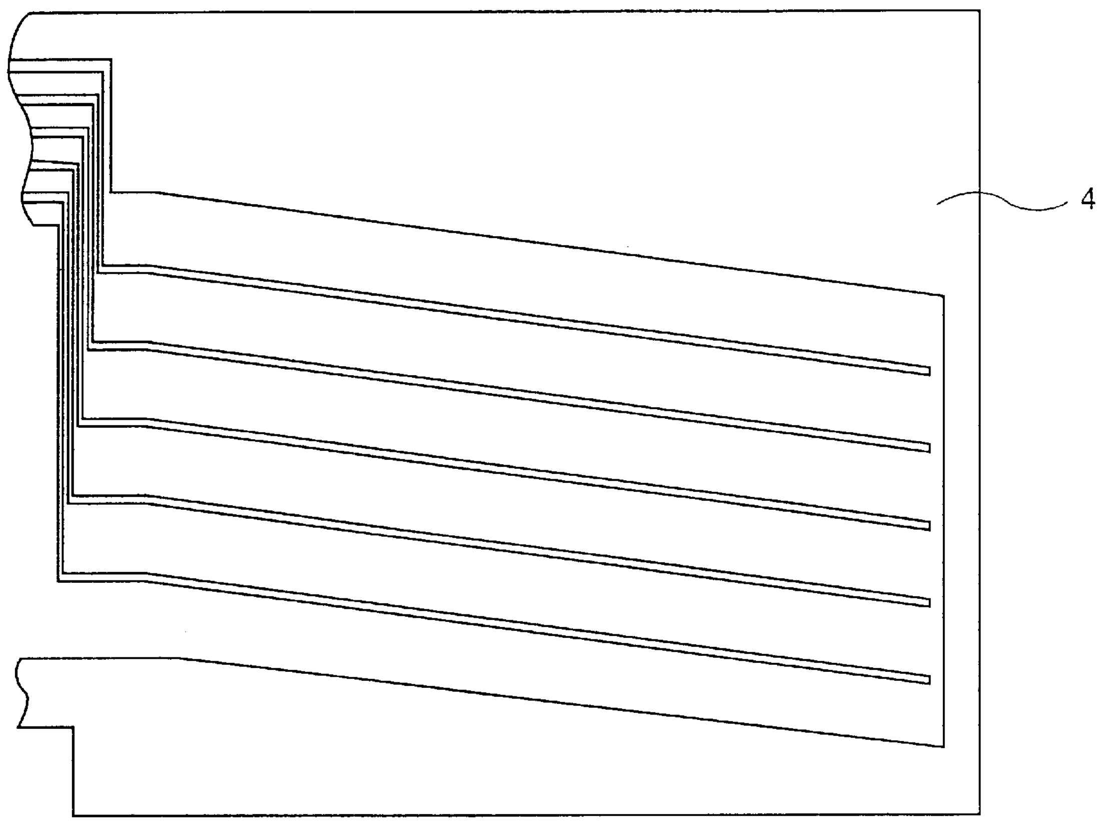
FIG. 7 shows a pattern of FPC bearing rear electrodes of the oscillator.

The electrodes 5 on the side of the oscillating plate of FPC 14 have rows in the Y direction connected commonly (FIG. 5). Electrodes 9 of another FPC 17 have columns in X direction connected in common (FIG. 7). By combining these and performing matrix-wise driving, the number of FPC wires and the number of drivers can be reduced, and hence the cost can be reduced. Further, at this time, the electrodes on the side of the oscillating plate are processed to have a pattern common to the oscillators in the longitudinal direction, and the electrodes on the opposite sides are processed to have a pattern common to the oscillating plates in the shorter side direction. By such patterning, the portion of contact between the PZT and the opposite electrodes can be reduced, and binding of the movement of the oscillating plate can be suppressed.

Second Embodiment

Another embodiment of the present invention will be described with reference to FIGS. 3 and 4.

Figure 3:
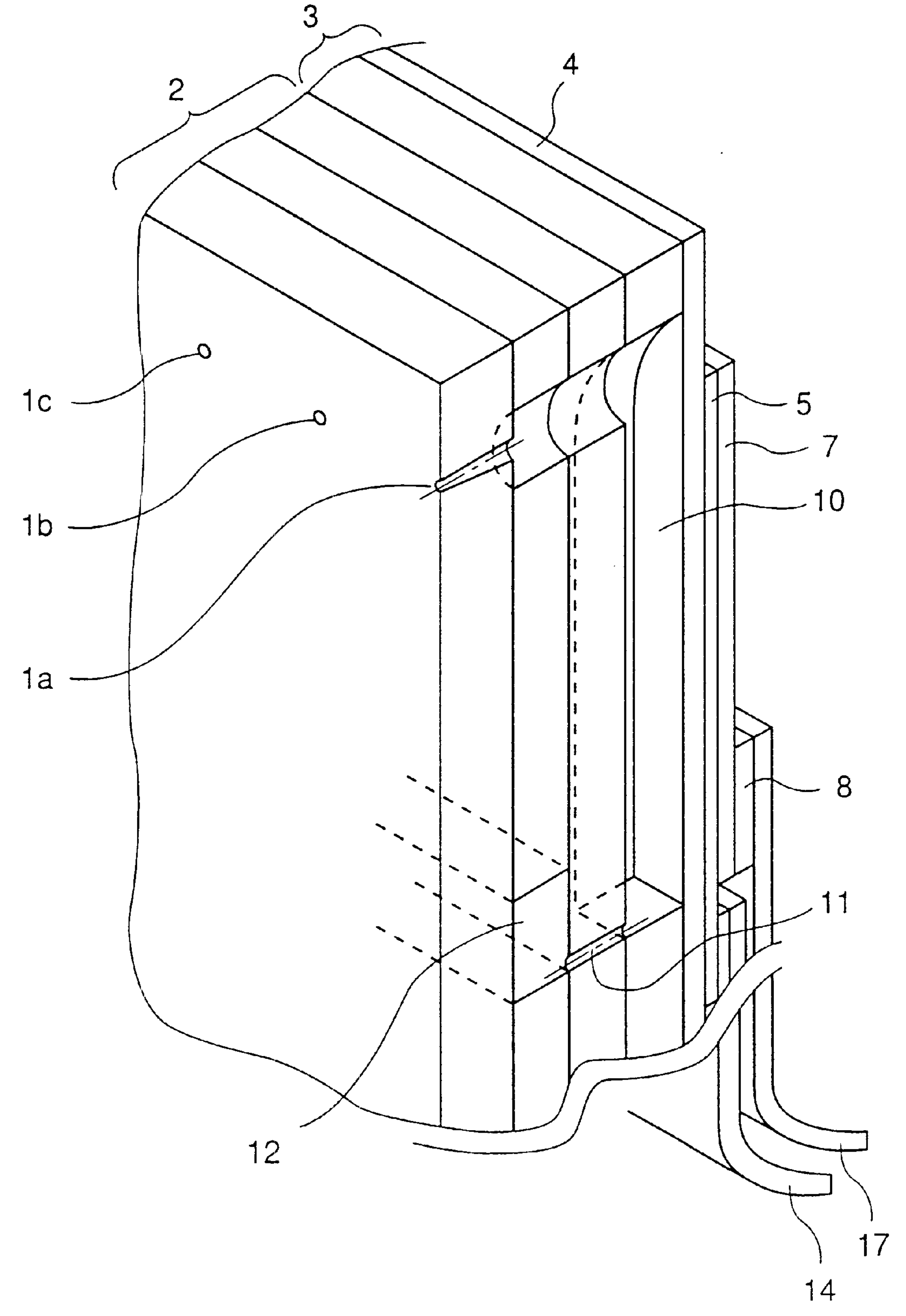
FIG. 3 is a perspective view of another embodiment of the ink jet head in accordance with the present invention.
Figure 4A:
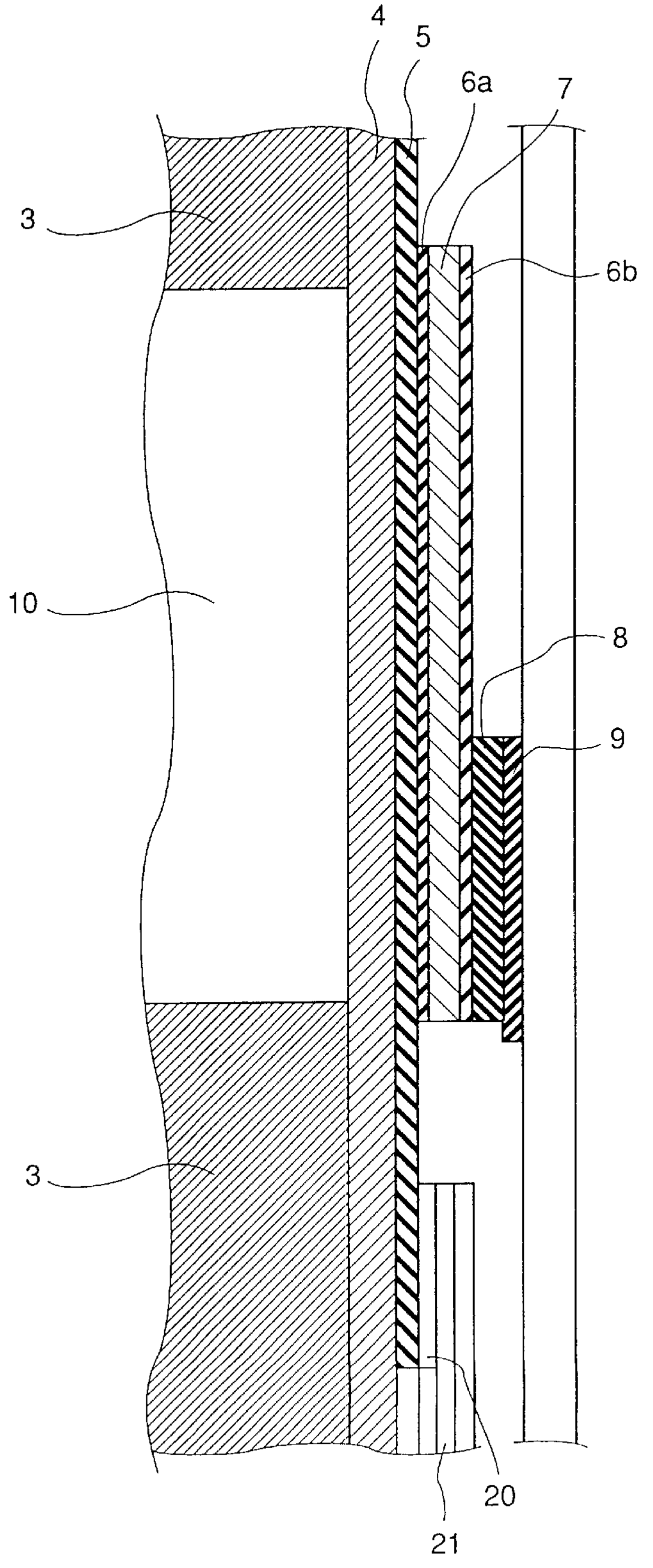
FIG. 4*a* is a side view of the aforementioned another embodiment of the ink jet head in accordance with the present invention.
Figure 4B:
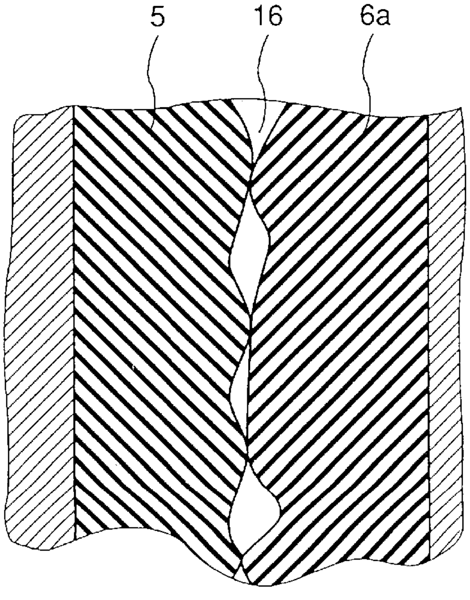
FIG. 4*b* is a partial enlargement of FIG. 4*a*.

FIG. 3 and FIGS. 4*a* and 4*b* show another embodiment of the present invention. Pressure chamber forming member 3 is formed of a plastic material, such as polyether sulfone. Oscillating plate 4 is also formed of the same material. If the surfaces of these are melted by means of a solvent, such as a methyl ethyl ketone if these are both formed of polyether sulfone, the surfaces are brought into pressure contact. Since adhesive is not used, undesirable influence such as flowing of adhesive into the pressure chamber can be avoided, and highly strong adhesion is realized.

An electrode 5 serving also as an elastic plate and a signal line connecting electrode 5 to an electrode 21 on the side of the FPC oscillating plate are formed on oscillating plate 4 by sputtering or vapor deposition. Alternatively, a method may be used in which an electrode material such as copper foil is deposited on the oscillating plate and an electrode pattern is formed by etching. The signal line on oscillating plate 4 is connected to FPC 14 by anisotropic conductive film 20 or the like. On electrode 5 serving also as an elastic plate, electrode 6*a* of oscillator 7 is adhered, and the other electrode 6*b* of the oscillator is connected to FPC 17 by anisotropic conductive film 8.

Here, by forming an electrode by sputtering or vapor deposition on an oscillating plate, it becomes possible to process the oscillating plate and the electrode without using any adhesive, a process for providing each electrode becomes unnecessary, and hence dimensional precision can be improved. When the electrodes are formed collectively by etching, it becomes unnecessary to position each material for providing electrode one by one. Therefore, the manufacturing steps can be simplified and dimension precision can be improved. Further, since the nozzle body and the oscillating plate are bonded by melting the surfaces using a solvent, highly strong bonding becomes possible. Further, since the problem of flowing of the adhesive to the nozzle constituting portion can be avoided, stable dimensional precision can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ink jet head in which oscillation is caused in a pressure chamber communicated with a nozzle to bend a portion of a wall surface of said pressure chamber thereby to emit ink, comprising:

an oscillating plate formed of resin provided on at least a portion of the wall surface of said pressure chamber;

a unimorph including an elastic plate and an oscillator, provided on said oscillating plate the oscillator including electrodes distinct from the elastic plate; and said oscillator is adhered to said elastic plate by a first adhesive layer, and adhered to a terminal by a second adhesive layer, said second adhesive layer being thicker than said first adhesive layer; wherein dimension of a bending portion provided by said unimorph is larger than dimension of the wall surface of said pressure chamber corresponding to said unimorph.

2. The ink jet head according to claim 1, further comprising a conductive film provided on said oscillator which serves as an electrode, wherein the first adhesive layer is at most 5 $\mu$m thick and the second adhesive layer is about 35 $\mu$m thick.

3. The ink jet head according to claim 1, wherein said first adhesive layer is a conductive adhesive.

4. The ink jet head according to claim 1, wherein said second adhesive layer is an anisotropic conductive film.

5. The ink jet head according to claim 1, wherein said pressure chamber includes a plurality of pressure chambers provided as a matrix in row and column directions, said elastic plate operates as an electrode in said row direction, and a conductive electrode in said column direction is formed on a side of said oscillator opposite to said elastic plate.

6. The ink jet head according to claim 1, wherein said first adhesive layer is epoxy resin.

7. The ink jet head according to claim 1, wherein the oscillator is a piezoelectric material.

8. The ink jet head according to claim 2, wherein said conductive film is provided on a first surface of the oscillator;

a second conductive film serving as an electrode provided on a second surface of the oscillator; and said first and second adhesive layers are provided on each conductive film.

9. The ink jet head according to claim 1, wherein there are two electrodes each located on opposite surfaces of the oscillator and the first adhesive layer bonds to the elastic plate and one electrode and the second adhesive layer bonds to the second electrode and the terminal.

10. The ink jet head according to claim 9, wherein the first adhesive layer is at most 5 $\mu$m thick and the second adhesive layer is about 35 $\mu$m thick.

11. The ink jet head according to claim 9, wherein the first adhesive layer is an insulator and a dimension of the first adhesive allows passage of electrical current.

12. The ink jet head according to claim 10, wherein the first adhesive layer is an insulator and a dimension of the first adhesive allows passage of electrical current.

13. The ink jet head according to claim 11, wherein the first adhesive layer is epoxy.

14. The ink jet head according to claim 12, wherein the first adhesive layer is epoxy.

* * * * *

UNITED STATES PATENT AND TRADEMARK OFFICE

CERTIFICATE OF CORRECTION

PATENT NO. : 6,471,341 B1 
DATED : October 29, 2002
INVENTOR(S) : Hisashi Yoshimura, Kohji Tsurui and Kazuya Koyama It is certified that error appears in the above-identified patent and that said Letters Patent is hereby corrected as shown below:

The title page showing the illustrative figures should be deleted to be replaced with the attached title page.

Drawing sheets 2, 3, 5, 8, 9, 10 and 11, Figs. 1b-1c, 2a-2b, 4a-4b, 8a-8b, 9a-9f, 10, 11a, and 11b, should be deleted to be replaced with the corrected sheets and Figs. as shown on the attached page.

Signed and Sealed this

Second Day of September, 2003

JAMES E. ROGAN
*Director of the United States Patent and Trademark Office*

(12) United States Patent
Yoshimura et al.

(10) Patent No.: US 6,471,341 B1
(45) Date of Patent: *Oct. 29, 2002

(54) INK JET HEAD ALLOWING HIGHLY DENSE ARRANGEMENT OF NOZZLES

(75) Inventors: Hisashi Yoshimura, Nara; Kohji Tsurui, Sakurai; Kazuya Koyama, Ikoma, all of (JP)

(73) Assignee: Sharp Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/620,316

(22) Filed: Mar. 22, 1996

(30) Foreign Application Priority Data

Mar. 23, 1995 (JP) ............................................. 7-063944

(51) Int. Cl.[7] ............................................. G01D 15/18
(52) U.S. Cl. ............................. 347/70; 347/68; 347/71
(58) Field of Search ............................... 347/68, 70, 71

(56) References Cited

U.S. PATENT DOCUMENTS 4,199,769 A 4/1980 Fischbeck .................... 341/48
4,455,560 A * 6/1984 Louzil ......................... 347/71
4,520,374 A * 5/1985 Koto ........................... 347/71
4,550,325 A * 10/1985 Viola .......................... 347/68
5,359,350 A * 10/1994 Nakano et al. ............... 347/68
5,360,943 A * 11/1994 Mori et al. ................ 174/84 R
5,575,577 A * 11/1996 Kawakami et al. ....... 400/705.1
5,660,486 A * 8/1997 Okuda et al. .......... 400/120.07

OTHER PUBLICATIONS

Patent Abstracts of Japan, vol. 18, No. 065, Feb. 3, 1994.
Patent Abstracts of Japan, vol. 17, No. 201, Apr. 20, 1993.
Patent Abstracts of Japan, vol. 16, No. 471, Sep. 30, 1992.
Patent Abstracts of Japan, vol. 18, No. 115, Feb. 24, 1994.
Patent Abstracts of Japan, vol. 17, No. 679, Dec. 14, 1993.
Patent Abstracts of Japan, vol. 18, No. 304, Jun. 10, 1994.
Patent Abstracts of Japan, vol. 17, No. 576, Oct. 20, 1993.
Patent Abstracts of Japan, vol. 17, No. 595, Oct. 29, 1993.
Patent Abstracts of Japan, vol. 18, No. 398, Jul. 26, 1994.
Patent Abstracts of Japan, vol. 94, No. 011.
Patent Abstracts of Japan, vol. 16, No. 195, May 12, 1992.
Patent Abstracts of Japan, vol. 18, No. 025, Jan. 14, 1994.

* cited by examiner

*Primary Examiner*—Bao Q. Vu

(57) ABSTRACT

An ink jet head includes an ink supply path, a pressure chamber, an orifice and an oscillator. By bending a portion of the wall surface of the pressure chamber by oscillation of oscillator, ink is emitted. A portion of the wall surface of pressure chamber is formed by an oscillating plate of resin, and a unimorph including an elastic plate and oscillator provided on oscillating plate. Sidewalls separating the inside of pressure chamber are provided, and the dimension between the sidewalls is made shorter than the dimension of the unimorph.

14 Claims, 11 Drawing Sheets

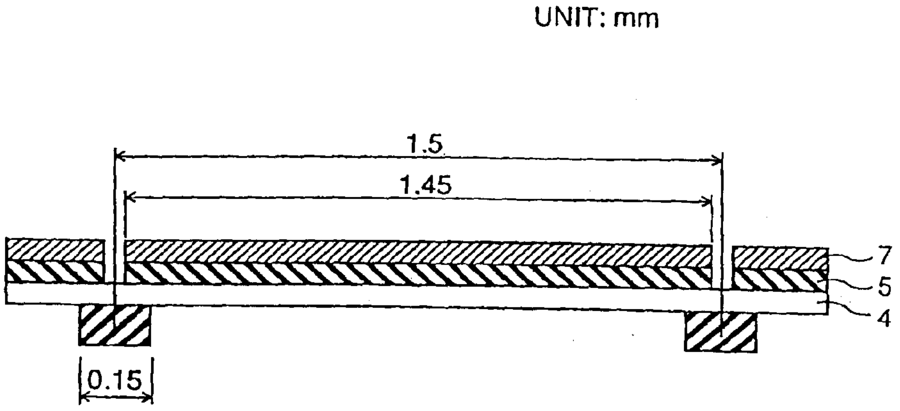

Fig.8b
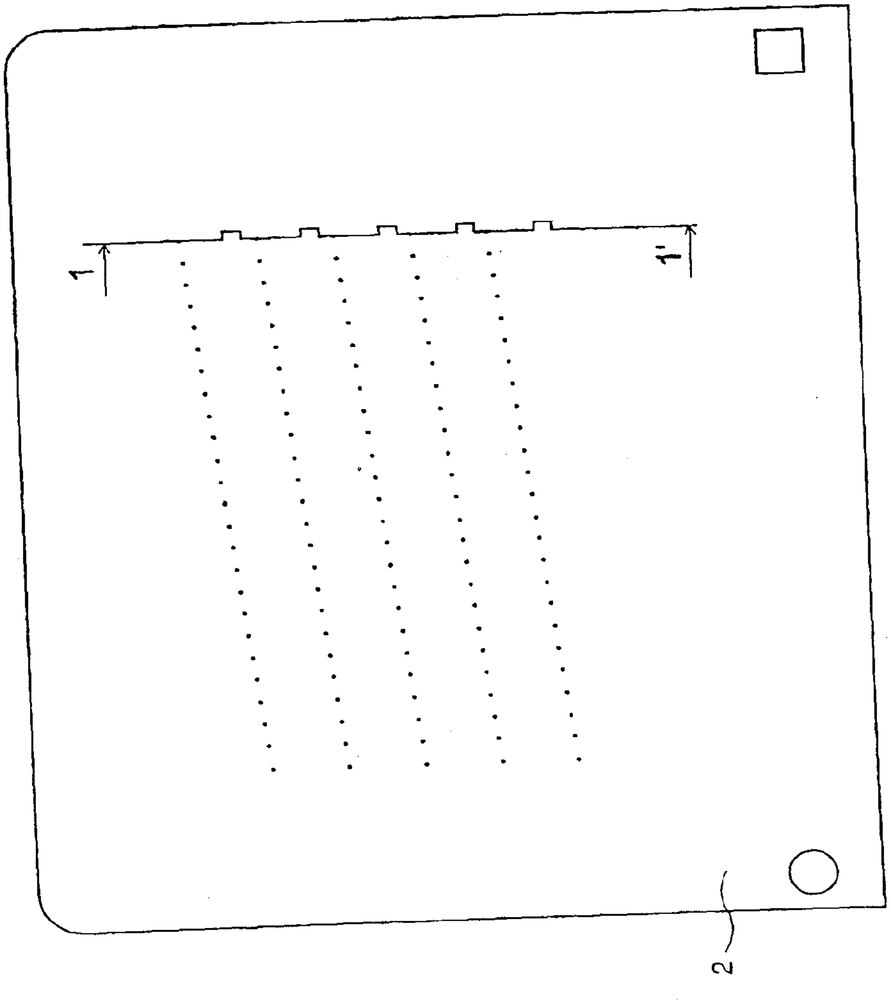
Fig.8a